(12) United States Patent
Ishikawa (10) Patent No.: US 8,540,602 B2
(45) Date of Patent: Sep. 24, 2013

(54) DRIVE DEVICE FOR HYBRID VEHICLE

(75) Inventor: Masatoshi Ishikawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 67 days.

(21) Appl. No.: 13/137,853

(22) Filed: Sep. 19, 2011

(65) Prior Publication Data

US 2012/0071294 A1   Mar. 22, 2012

(30) Foreign Application Priority Data

Sep. 22, 2010   (JP) .................................. 2010-211530

(51) Int. Cl.
*B60W 10/08* (2006.01)

(52) U.S. Cl.
USPC ............... 477/5; 477/168; 477/174; 477/167; 192/3.26; 192/3.29; 180/65.265; 180/65.245; 180/65.275

(58) Field of Classification Search
None
See application file for complete search history.

(56) References Cited

U.S. PATENT DOCUMENTS

| | | | |
|---|---|---|---|
| 6,183,389 B1 * | 2/2001 | Tabata ............................... | 477/5 |
| 6,258,008 B1 * | 7/2001 | Tabata et al. ................... | 477/107 |
| 6,685,591 B2 * | 2/2004 | Hanyu et al. ...................... | 475/5 |
| 7,303,504 B2 * | 12/2007 | Uchisasai et al. ................. | 477/5 |

FOREIGN PATENT DOCUMENTS

| | | |
|---|---|---|
| JP | 2010-163085 A | 7/2010 |
| JP | 2010-167898 A | 8/2010 |

* cited by examiner

*Primary Examiner* — David D Le
*Assistant Examiner* — Mark Manley
(74) *Attorney, Agent, or Firm* — McGinn IP Law Group, PLLC (57) ABSTRACT

A drive device for a hybrid vehicle is provided with an engine and a motor generator. A one-way clutch is provided between the engine and the motor generator. Power is transmitted from the engine to the motor generator, while power from the motor generator to the engine is blocked. As a result, the electric motor can be operated without operating the engine. Furthermore, a torque converter is connected to the motor generator, and the engine is connected to the torque converter via a starting clutch. As a result, if a one-way clutch is provided, the motor generator can serve as a starter motor.

6 Claims, 7 Drawing Sheets

DRIVE DEVICE FOR HYBRID VEHICLE

CROSS REFERENCES TO RELATED APPLICATIONS

The present application claims priority from Japanese Patent Application No. 2010-211530 filed on Sep. 22, 2010, the entire contents of which are hereby incorporated by reference.

BACKGROUND OF THE INVENTION

1. Field of the Invention

The present invention relates to a drive device for a hybrid vehicle that includes an engine and an electric motor.

2. Description of the Related Art

As a drive device for a hybrid vehicle equipped with an engine and an electric motor, there has been developed a two-motor drive device that uses two electric motors (see Japanese Unexamined Patent Application Publication (JP-A) No. 2010-167898, for example). The two-motor drive device includes an electric motor for power generation connected to an engine and an electric motor for running connected to a drive system, and power dividing mechanism is provided between these electric motors. The two-motor drive device can disconnect the engine from the drive system and stop the engine when a vehicle is run by only the motor for running, thereby improving energy efficiency. However, the use of the two-motor drive device causes an increase the number of parts and complexity of the drive device, thereby causing an increase in cost of a hybrid vehicle.

Then, there has been developed a one-motor drive device in which an electric motor is connected directly to a crankshaft of an engine and is used for both power generation and running, thereby reducing the number of electric motors to one (see Japanese Unexamined Patent Application Publication (JP-A) No. 2010-163085, for example). The use of the one-motor drive system can reduce the number of parts as well as eliminate a large modification of a conventional drive device, thereby achieving cost reduction of a hybrid vehicle.

However, since the one-motor drive device directly connects the electric motor to the engine, the engine cannot be disconnected from the electric motor. Accordingly, even in a traveling mode in which the engine is not used, the engine has to be run idle to operate the electric motor, which makes it difficult to improve energy efficiency. Furthermore, since the engine cannot be disconnected from the electric motor upon regenerative braking, it is difficult to increase the amount of regenerative electric power by the engine brake. As described, the employment of the one-motor drive device leads to the reduction in energy efficiency of a hybrid vehicle.

SUMMARY OF THE INVENTION

An object of the present invention is to improve energy efficiency of a hybrid vehicle.

A drive device for a hybrid vehicle according to an aspect of the present invention is a drive device for a hybrid vehicle that has an engine and an electric motor connected to a drive wheel. The drive device for a hybrid vehicle includes: a one-way clutch that is disposed between the engine and the electric motor, connects the engine and the electric motor when the engine speed reaches to the motor speed, and disconnects the engine and the electric motor when the engine speed falls below the motor speed; and a starting clutch that is disposed between the engine and the electric motor and is switched between a fastened state for connecting the engine and the electric motor and a released state for disconnecting the engine and the electric motor. Upon motor traveling and regenerative braking, the engine is disconnected from the electric motor by the one-way clutch. Upon engine startup, the starting clutch is engaged so as to connect the engine to the electric motor.

According to another aspect of the present invention, the drive device for a hybrid vehicle is provided with a torque converter between the electric motor and the drive wheel, and the starting clutch is connected to the electric motor via the torque converter.

According to another aspect of the present invention, the drive device for a hybrid vehicle has an oil pump that is driven by the electric motor and a running clutch that is disposed between the electric motor and the drive wheel and is switched between a fastened state for transmitting power and a released state for blocking power. When the engine is stopped before vehicle startup, the oil pump is driven by the electric motor while the running clutch is put in the released state.

According to another aspect of the present invention, the drive device for a hybrid vehicle has a torque converter between the electric motor and the drive wheel. Upon motor traveling, power is transmitted from the electric motor to the drive wheel via the torque converter.

According to another aspect of the present invention, the drive device for a hybrid vehicle is characterized in that power is transmitted from the electric motor to the engine via the starting clutch upon engine startup.

According to another aspect of the present invention, the drive device for a hybrid vehicle is characterized in that the torque converter has a lock-up clutch, and upon engine startup the drive device for a hybrid vehicle is switched between a first startup mode in which power is transmitted from the electric motor to the engine via the torque converter and the starting clutch and a second startup mode in which power is transmitted from the electric motor to the engine via the starting clutch, depending on the vehicle state.

According to another aspect of the present invention, the drive device for a hybrid vehicle is characterized in that power is transmitted from the engine to the drive wheel via the one-way clutch after engine startup.

According to another aspect of the present invention, the drive device for a hybrid vehicle has a torque converter that is equipped with a lock-up clutch between the electric motor and the drive wheel. Upon regenerative braking, power is transmitted from the drive wheel to the electric motor via the lock-up clutch.

According to the present invention, since the one-way clutch is disposed between the engine and the electric motor, the engine is disconnected from the electric motor by the one-way clutch upon motor traveling and regenerative braking. As a result, the electric motor can be operated without operating the engine, thereby enhancing the energy efficiency of the hybrid vehicle and improving fuel efficiency. Furthermore, since the starting clutch is disposed between the engine and the electric motor, the electric motor can function as a starter motor even if the one-way motor is installed, thereby eliminating a starter motor for the engine, and achieving cost reduction in the drive device.

DESCRIPTION OF THE PREFERRED EMBODIMENTS

Figure 1:
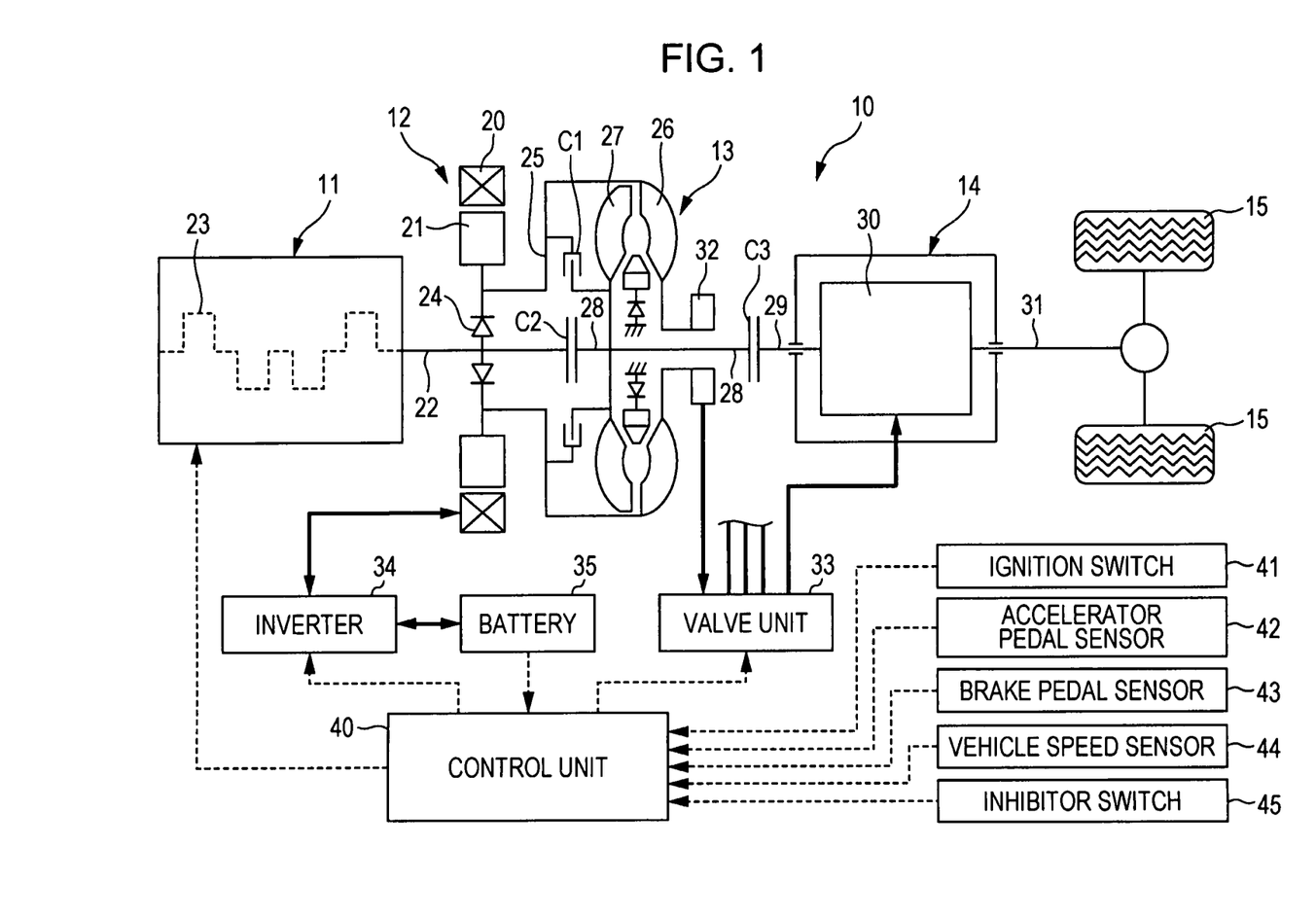
FIG. 1 is a schematic view showing a drive device for a hybrid vehicle according to an embodiment of the present invention.

Embodiments of the present invention will hereunder be described with reference to the drawings. FIG. 1 is a schematic view showing a drive device 10 for a hybrid vehicle according to an embodiment of the present invention. As shown in FIG. 1, the drive device 10 includes an engine 11 and a motor generator (electric motor) 12 as driving sources. The drive device 11 is also provided with a torque converter 13 and a transmission 14. Power output from the engine 11 and the motor generator 12 is transmitted to drive wheels 15 via the torque converter 13 and the transmission 14. The drive device 10 shown in the drawing is a one-motor drive device that is equipped with one motor generator 12 as a driving source.

The motor generator 12 includes a stator 20 fixed in a housing (not shown) and a rotor 21 rotatably installed inside the stator 20. A power transmission shaft 22 is disposed at the rotating center of the rotor 21 that is connected to a crank shaft 23 of the engine 11. The power transmission shaft 22 is connected to the rotor 21 via a one-way clutch 24, and power is transmitted from the power transmission shaft 22 to the rotor 21 while power from the rotor 21 to the power transmission shaft 22 is blocked. In other words, by providing the one-way clutch 24 between the engine 11 and the motor generator 12, power is transmitted from the engine 11 to the motor generator 12, while power from the motor generator 12 to the engine 11 is blocked.

The one-way clutch 24 includes an inner race (not shown) that is fitted into the power transmission shaft 22, an outer race (not shown) that is fitted into the rotor 21, and a plurality of sprags (not shown) embedded between the inner and outer races. The one-way clutch 24 has a structure such that when the outer race rotates in a predetermined direction with respect to the inner race, the sprags tilt so as to be thrust into the races, whereby the one-way clutch 24 transmits the rotational motion only in one direction. In other words, when the engine speed (rotation speed of the crank shaft) reaches to the motor speed (rotation speed of the rotor), the engine 11 is connected to the motor generator 12 via the one-way clutch 24. On the other hand, when the engine speed falls below the motor speed, the engine 11 is disconnected from the motor generator 12 by the one-way clutch 24. Note that the one-way clutch 24 is not limited to a one-way sprag clutch, but a one-way clutch of another type may be used.

The rotor 21 of the motor generator 12 is connected to the torque converter 13 which increases and outputs a torque. The torque converter 13 has a pump impeller 26 connected to the rotor 21 via a front cover 25 and a turbine runner 27 facing with the pump impeller 26. The torque converter 13 transmits power from the pump impeller 26 to the turbine runner 27 via hydraulic fluid. As indicated, the torque converter 13 is a sliding component, and thus a lock-up clutch C1 is provided between the front cover 25 and the turbine runner 27. The front cover can be directly connected to the turbine runner 27 by fastening the lock-up clutch C1, thereby improving power transmission efficiency.

The turbine runner 27 is connected to a turbine shaft 28, from which power passing through the torque converter 13 is output. One end of the turbine shaft 28 extends to the engine 11, and the turbine shaft 28 is connected to the power transmission shaft 22 by a starting clutch C2. The starting clutch C2 is switched between a fastened state for connecting the turbine shaft 28 and the power transmission shaft 22 and a released state for disconnecting the turbine shaft 28 and the power transmission shaft 22. The engine 11 can be connected to the motor generator 12 via the torque converter 13 by fastening the starting clutch C2. In other words, the engine 11 can be connected to the motor generator 12, bypassing the one-way clutch 24, by fastening the starting clutch C2. Furthermore, the other end of the turbine shaft 28 extends to the transmission 14, and the turbine shaft 28 is connected to a transmission input shaft 29 via a running clutch 3C. The running clutch 3C is switched between a fastened state for connecting the turbine shaft 28 and the transmission input shaft 29 and a released state for disconnecting the turbine shaft 28 and the transmission input shaft 29. Engine power and motor power can be transmitted to the transmission 14 from the turbine shaft 28 by fastening the running clutch 3C.

The transmission 14 is provided with a chain-drive continuously variable transmission as a transmission mechanism 30. The transmission mechanism 30 has a primary pulley and a secondary pulley (not shown), and a drive chain (not shown) is wound between the pulleys. The winding diameter of the drive chain can be changed by hydraulically controlling the groove widths of the pulleys, whereby stepless shifting from the transmission input shaft 29 to a transmission output shaft 31 can be performed. The transmission mechanism 30 is not limited to the chain-drive continuously variable transmission, but a belt-drive continuously variable transmission or a traction-drive continuously variable transmission may be used, and, furthermore, a planetary gear automatic transmission and a parallel shaft automatic transmission may be used.

An oil pump 32 is connected to the pump impeller 26 so as to supply hydraulic fluid to the torque converter 13, the transmission mechanism 30, lock-up clutch C1, the starting clutch C2, the running clutch C3 and the like. In addition, the drive device 10 is provided with a valve unit 33 including a plurality of magnetic valves so as to control the supply of hydraulic fluid discharged from the oil pump 32 to the transmission mechanism 30 and the like. Furthermore, the stator 20 is connected to a battery 35 via an inverter 34 so as to control the supply of electric power to the motor generator 12.

The drive device 10 is provided with a control unit 40 as control means so as to control the engine 1, the motor generator 12, the transmission mechanism 30 and the like. The control unit 40 is connected to an ignition switch 41 operated by a driver, an accelerator pedal sensor 42 for detecting an operation state of an accelerator pedal, a brake pedal sensor 43 for detecting an operation state of a brake pedal, a vehicle speed sensor 44 for detecting a vehicle speed, an inhibitor switch 45 detecting a selected running range and the like. Furthermore, the control unit 40 receives information such as temperature, voltage and current from the battery 35 and calculates the state of charge (SOC) of the battery 35 based on the information. Then the control unit 40 determines the vehicle state based on the information from the sensors, and outputs a control signal to the engine 11, the valve unit 33, the inverter 34 and the like. The control unit 40 is provided with a CPU for calculating the control signal and the like, a ROM for storing a control program, a computing equation, map data and the like, and a RAM for temporarily storing data.

Figure 2:
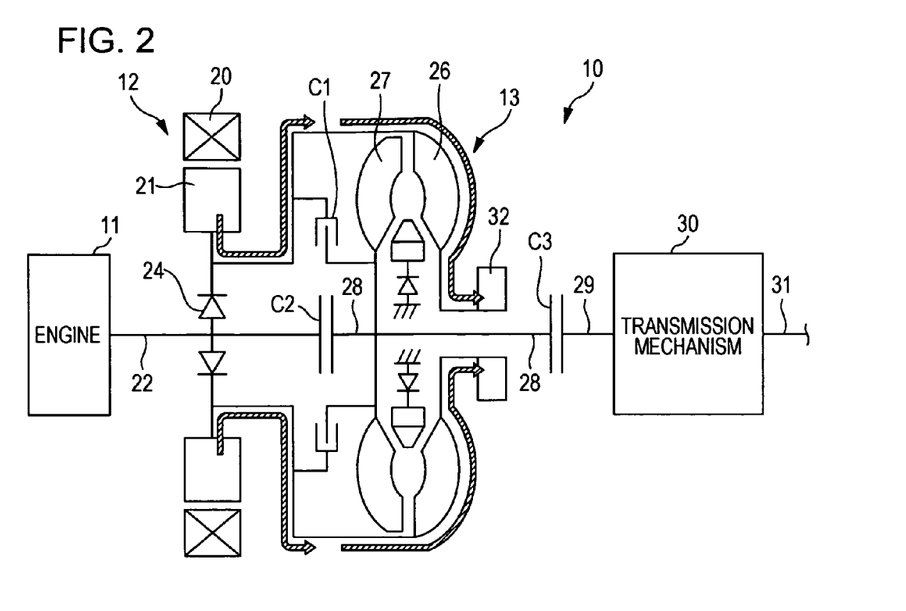
FIG. 2 is an explanatory view showing an operating state of the drive device.
Figure 3:
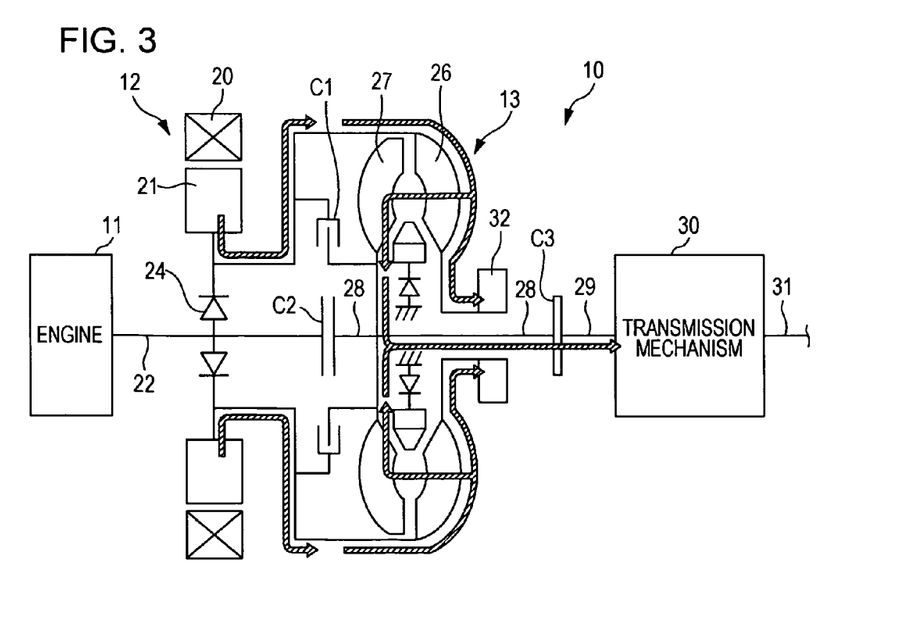
FIG. 3 is an explanatory view showing an operating state of the drive device.
Figure 4A:
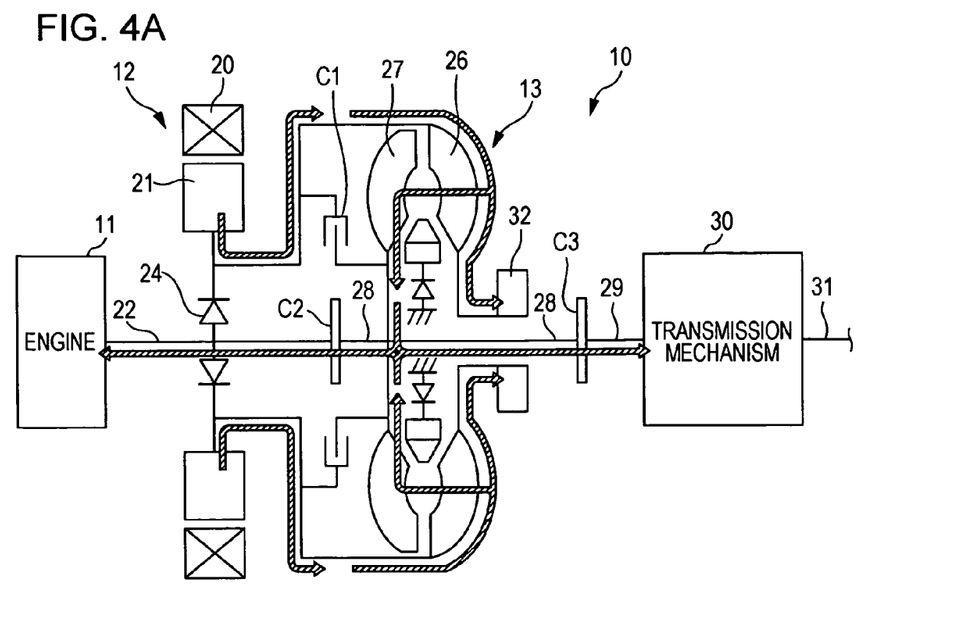
FIGS. 4A and 4B are explanatory views showing operating states of the drive device.
Figure 4B:
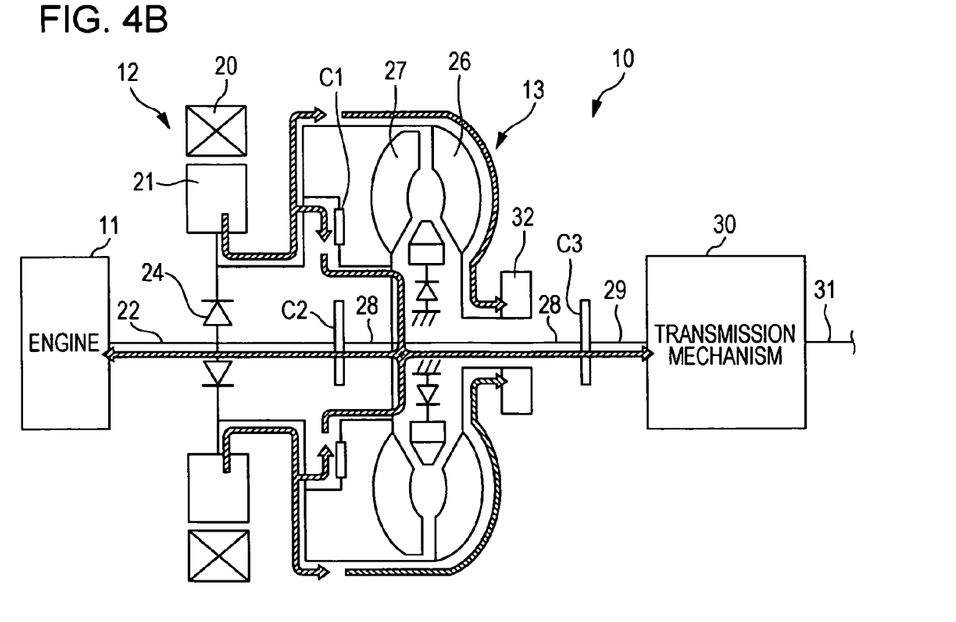
Figure 5A:
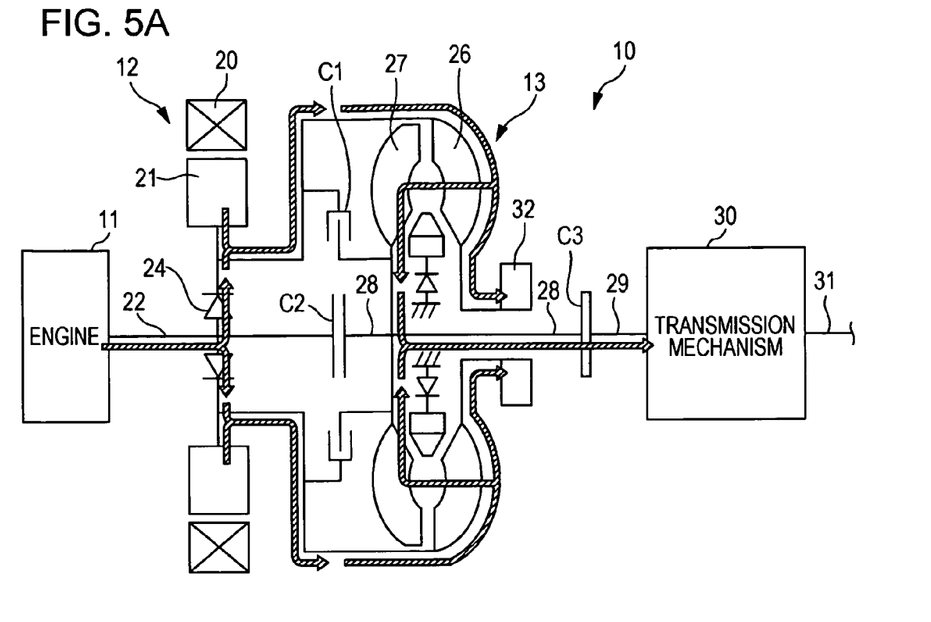
FIGS. 5A and 5B are explanatory views showing operating states of the drive device.
Figure 5B:
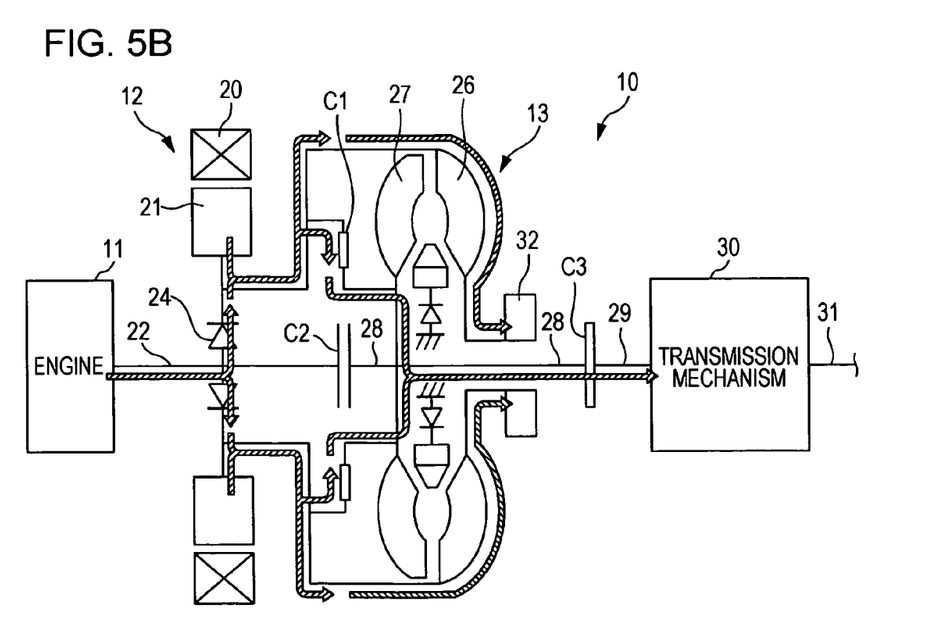
Figure 6:
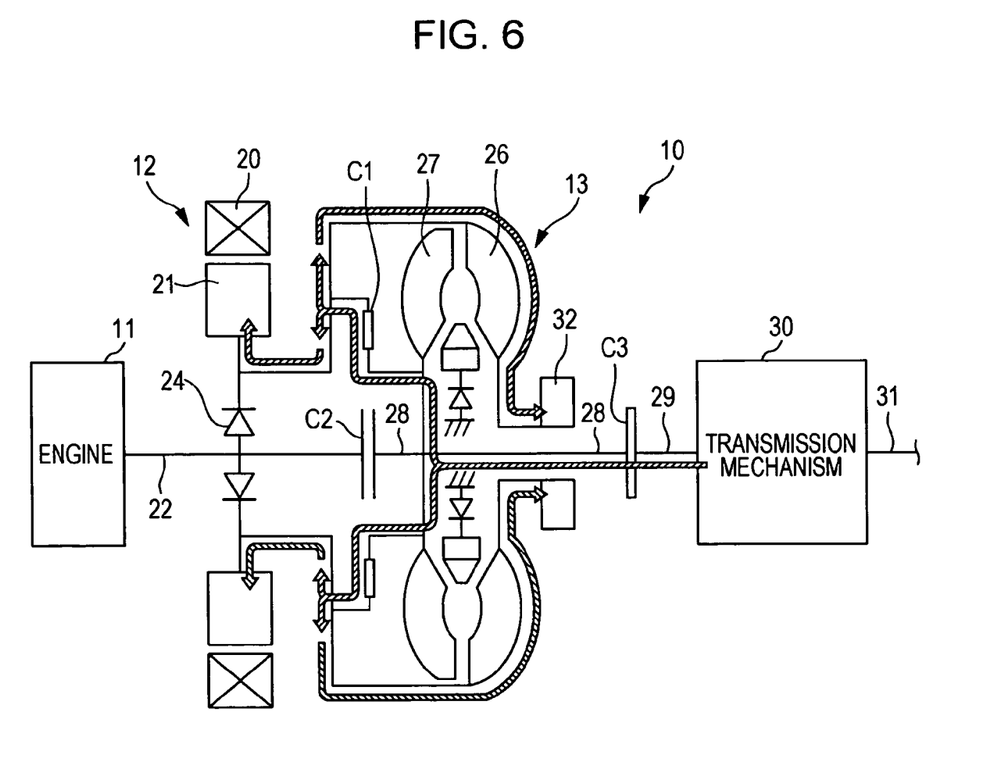
FIG. 6 is an explanatory view showing an operating state of the drive device.

Next, operating states of the drive device 10 will be explained. FIGS. 2 to 6 are explanatory views showing the operating states of the drive device 10. FIG. 2 shows the operating state when the ignition switch 41 is turned on, FIG. 3 shows the operating state upon vehicle startup in a motor traveling mode, FIGS. 4A and 4B show the operating states upon engine startup in the motor traveling mode. FIGS. 5A and 5B show the operating states in a parallel traveling mode, and FIG. 6 shows the operating state upon regenerative braking. Note that the motor traveling mode is a traveling mode in which only motor power is transmitted to the drive wheels 15, while the parallel traveling mode is a traveling mode in which motor power and engine power are transmitted to the drive wheels 15. Hatched arrows in FIGS. 2 to 6 indicate power pathways.

Firstly, when the engine is stopped before vehicle startup, and the ignition switch 41 is turned on, the lock-up clutch C1, the starting clutch C2 and the running clutch C3 are released so as to drive (power-drive) the motor generator 12, as shown in FIG. 2. Accordingly, the oil pump 32 can be driven by the motor generator 12, and a hydraulic pressure required by a hydraulic control system can be secured prior to vehicle running. Since the running clutch C3 is designed to be released at this stage, motor power is not transmitted to the transmission mechanism 30, whereby it is possible to prevent the transmission mechanism 30 from being damaged due to a skid of the drive chain or the like. Furthermore, the engine 11 can be disconnected from the motor generator 12 by the one-way clutch 24, whereby it is possible to maintain the engine 11 in the stopping state.

As described, although the drive device 10 is a one-motor type, the oil pump 32 can be driven by the motor generator 12 without operating the engine 11, whereby energy efficiency of the hybrid vehicle can be enhanced and fuel efficiency thereof can be improved. In addition, since the oil pump 32 can be driven without operating the engine 11, a drive motor exclusively for the oil pump is not necessary to be installed, whereby cost reduction of the drive device 10 can be achieved. Furthermore, since a control hydraulic pressure can be raised before vehicle running, it is not necessary to prevent a hydraulic pressure leak in the hydraulic control system upon obtaining the control hydraulic pressure, whereby cost reduction of the hydraulic control system can be achieved.

Next, upon start-up, at which a hybrid vehicle is started from a stop state, the running clutch C3 is switched to the fastened state, and the motor generator 12 is driven, as shown in FIG. 3. As a result, the hybrid vehicle can be started by the motor generator 12 without operating the engine 11, whereby energy efficiency of the hybrid vehicle can be enhanced and fuel efficiency thereof can be improved. Furthermore, motor power from the motor generator 12 passes through the torque converter 13 so as to increase in terms of torque, whereby the size of the motor generator 12 can be reduced without affecting startup performance. In addition, since, as described earlier, the engine 11 is disconnected from the motor generator 12 by the one-way clutch 24 in the motor traveling mode (upon motor traveling), motor power is not lost due to the pumping loss of the idling engine 11, whereby energy efficiency of the hybrid vehicle can be enhanced and fuel efficiency thereof can be improved.

Then, when the engine is started during traveling so as to move to the parallel traveling mode as the vehicle speed increases, the starting clutch C2 is switched to the fastened state, as shown in FIG. 4A (first starting mode). Accordingly, the engine 11 can be connected to the motor generator 12 via the torque converter 13, whereby the engine 11 can be started with motor power. Since the motor generator 12 can function as a starter motor in this manner, a starter motor for engine startup can be eliminated, and cost reduction in the drive device 10 can be achieved. Furthermore, since the engine 11 is connected to the motor generator 12 via the torque converter 13 as shown in FIG. 4A, motor power can be smoothly transmitted to the engine 11, thereby suppressing shock upon engine startup. In addition, when an acceleration request from the driver is large and the traveling mode is quickly changed to the parallel traveling mode, the starting clutch C2 is switched to the fastened state and the lock-up clutch C1 is switched to the fastened state (second starting mode), as shown in FIG. 4B. Accordingly, the engine 11 can be directly connected to the motor generator 12, whereby the engine speed can be quickly increased so as to start the engine 11 quickly. As shown FIGS. 4A and 4B, whether or not to fasten the lock-up clutch C1, i.e., which of the first starting mode or the second starting mode to be performed, upon engine startup is determined by the control unit 40 based on the vehicle conditions such as acceleration request.

When the engine 11 is started, the starting clutch C2 is switched to the released state so as to increase the engine speed to the motor speed, as shown in FIGS. 5A and 5B. Accordingly, after engine startup, engine power is transmitted to the torque converter 13 via the one-way clutch 24, and output to the driving wheels 15 together with motor power. In this manner, by simply increasing the engine speed, the one-way clutch 24 can be fastened and the drive device 10 can be smoothly switched from the motor traveling mode to the parallel traveling mode. In the parallel traveling mode, the fastened state of the lock-up clutch C1 is controlled according to an acceleration request from the driver. When a large driving force is requested, as shown in FIG. 5A, the lock-up clutch C1 is switched to the released state, and power is transmitted via the torque converter 13, which becomes in a operational mode. When a large driving force is not requested, as shown in FIG. 5B, the lock-up clutch C1 is switched to the released state so as to improve power transmission efficiency in the drive device 10.

Upon regenerative braking, in which the accelerator pedal is released and the braking pedal is pressed, as shown in FIG. 6, the lock-up clutch C1 is switched to the fastened state and the motor generator 12 is controlled to be in a power generation state (regenerative state), whereby the engine 11 is controlled so as to go towards the stopping state. Accordingly, kinetic energy can be converted to electric energy, which can be recovered in the battery 35. Furthermore, since the engine 11 is controlled so as go towards the stopping state, the one-way clutch 24 can be released while the engine speed is decreased, whereby the engine 11 can be easily disconnected from the motor generator 12. As a result, kinetic energy is not reduced by engine braking and more kinetic energy can be supplied to the motor generator 12, thereby increasing the power regeneration amount by the motor generator 12.

Upon reacceleration after deceleration, the drive control 10 is controlled according to the acceleration request from the driver and the like. When the acceleration request from the driver is small, the motor traveling mode, in which only motor power is transmitted to the drive wheels 15, is performed, as shown in FIG. 3. On the other hand, when the acceleration request from the driver is large, the parallel traveling mode, in which motor power and engine power are transmitted to the drive wheels 15 is performed, as shown in FIGS. 4A to 5B.

Figure 7A:
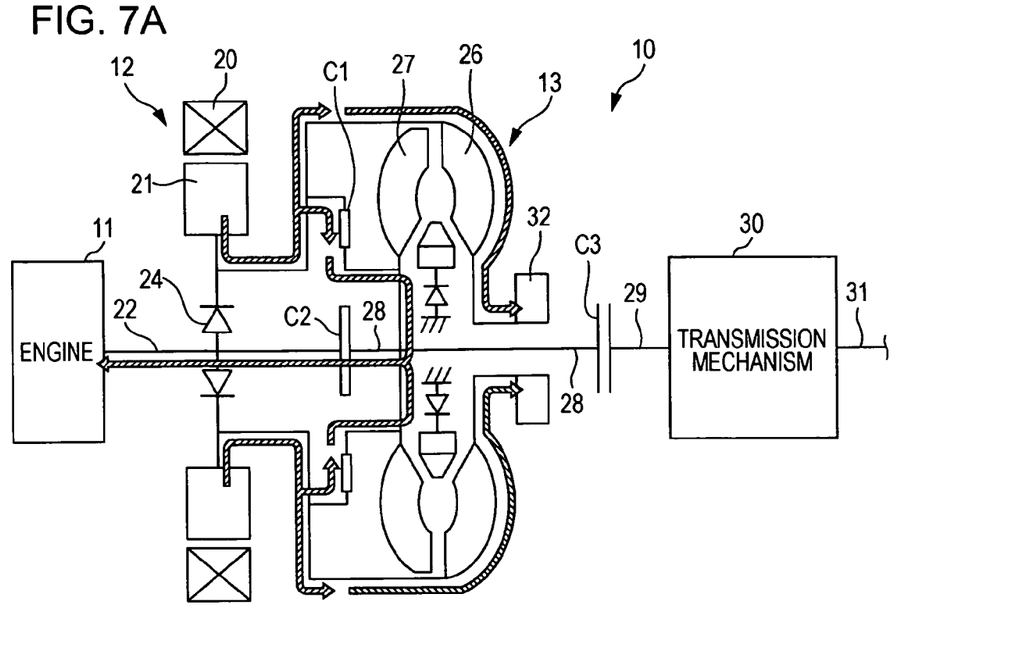
FIGS. 7A and 7B are explanatory views showing operating states of the drive device.
Figure 7B:
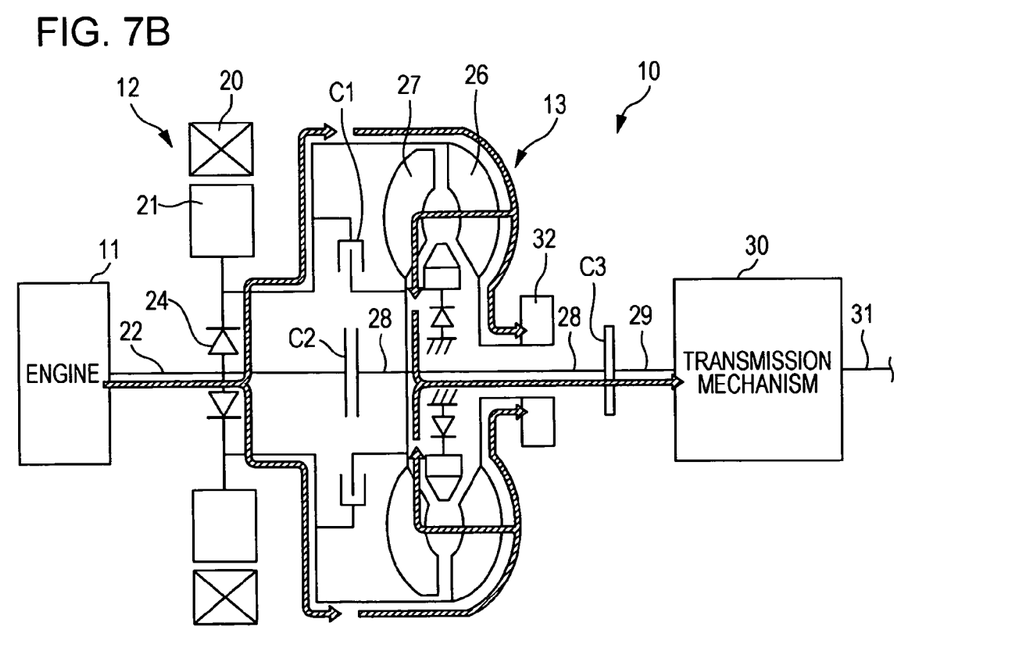

In the above description, the motor traveling mode is performed upon startup so as to improve energy efficiency of the hybrid vehicle. However, the present invention is not limited thereto, and an engine traveling mode in which only engine power is transmitted to the drive wheels 15 may be performed upon startup. For example, when the state of charge (SOC) of the battery 35 is low, the engine traveling mode is performed from startup so as to prevent the battery 35 from discharging excessively. FIGS. 7A and 7B show operating states of the drive device 10. FIG. 7A shows the state in which the engine 11 is started when the vehicle is stopped, and FIG. 7B shows the state upon startup in the engine traveling mode. Hatched arrows in FIGS. 7A and 7B indicate power pathways.

In the case in which the engine 11 is started when the vehicle is stopped, the lock-up clutch C1 and the starting clutch C2 are switched to the fastened state, and the motor generator 12 is driven (second starting mode), as shown in FIG. 7A. Accordingly, the engine 11 can be started with motor power. In the case the vehicle is started in the engine traveling mode after engine startup, the lock-up clutch C1 and the starting clutch C2 are switched to the released state, and the running clutch C3 is switched to the fastened state as shown in FIG. 7B. Accordingly, engine power is transmitted to the torque converter 13 via the one-way clutch 24, which is amplified by the torque converter 13. In this manner, sufficient startup performance can be secured by amplifying engine torque even upon startup in the engine traveling mode.

Figure 8:
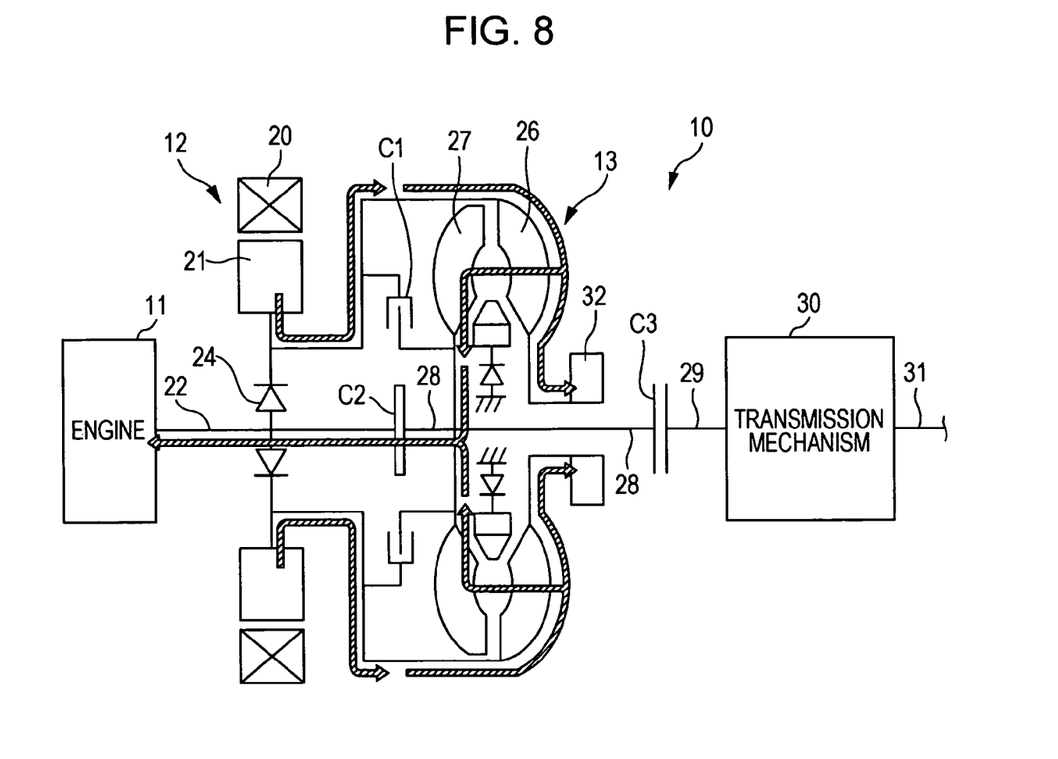
FIG. 8 is an explanatory view showing an operating state of the drive device.

The lock-up clutch C1 is fastened when the engine 11 is started as shown in FIG. 7A, but the present invention is not limited thereto. The lock-up clutch C1 may be released when the engine 11 is started. FIG. 8 is an explanatory view showing an operating state of the drive device 11, the state in which the engine 11 is started when the vehicle is stopped in cold weather. Hatched arrows in FIG. 8 indicate power pathways. As shown in FIG. 8, in cold weather, when it is difficult to output large motor torque, the motor generator 12 is driven with the lock-up clutch C1 being switched to the released state (first starting mode). Accordingly, motor torque can be increased via the torque converter 13, whereby the engine speed can be sufficiently increased even in cold weather, and the engine 11 can be reliably started. Whether or not to fasten the lock-up clutch C1, i.e., which of the first starting mode or the second starting mode to be performed, upon engine startup as shown FIGS. 7A and 7B is determined by the control unit 40 based on the vehicle conditions such as coolant temperature.

The present invention is not limited to the above-described embodiment. It will be apparent to those skilled in the art that various changes may be made without departing from the scope of the invention. For example, the lock-up clutch C1, the starting clutch C2 and the starting clutch C3 may be a friction clutch or a positive clutch.

What is claimed is:

1. A drive device for a hybrid vehicle that has an engine and an electric motor connected to a drive wheel, the drive device comprising:

a one-way clutch that is disposed between the engine and the electric motor, connects the engine and the electric motor when the engine speed reaches to the motor speed, and disconnects the engine and the electric motor when the engine speed falls below the motor speed; and a starting clutch that is disposed between the engine and the electric motor and is switched between a fastened state for connecting the engine and the electric motor and a released state for disconnecting the engine and the electric motor;

wherein upon motor traveling and regenerative braking, the engine is disconnected from the electric motor by the one-way clutch, and upon engine startup, the starting clutch is engaged so as to connect the engine to the electric motor;

wherein a torque converter is provided between the electric motor and the drive wheel, and the starting clutch is connected to the electric motor via the torque converter; and the torque converter has a lock-up clutch; and upon engine startup the drive device for a hybrid vehicle is switched between a first startup mode in which power is transmitted from the electric motor to the engine via the torque converter and the starting clutch and a second startup mode in which power is transmitted from the electric motor to the engine via the starting clutch, depending on the vehicle state.

2. The drive device for a hybrid vehicle according to claim 1, wherein an oil pump is provided that is driven by the electric motor;

a running clutch is provided that is disposed between the electric motor and the drive wheel and is switched between a fastened state for transmitting power and a released state for blocking power; and when the engine is stopped before vehicle startup, the oil pump is driven by the electric motor while the running clutch is put in the released state.

3. The drive device for a hybrid vehicle according to claim 1, wherein a torque converter is provided that is provided between the electric motor and the drive wheel; and upon motor traveling, power is transmitted from the electric motor to the drive wheel via the torque converter.

4. The drive device for a hybrid vehicle according to claim 1, wherein power is transmitted from the electric motor to the engine via the starting clutch upon engine startup.

5. The drive device for a hybrid vehicle according to claim 1, wherein power is transmitted from the engine to the drive wheel via the one-way clutch after engine startup.

6. The drive device for a hybrid vehicle according to claim 1, wherein a torque converter that is equipped with a lock-up clutch is provided between the electric motor and the drive wheel; and upon regenerative braking, power is transmitted from the drive wheel to the electric motor via the lock-up clutch.

* * * * *